United States Patent
Lee et al.

(10) Patent No.: US 8,295,630 B2
(45) Date of Patent: Oct. 23, 2012

(54) IMAGE PROCESSING SYSTEM AND METHOD

(75) Inventors: Chung-I Lee, Taipei Hsien (TW); Chien-Fa Yeh, Taipei Hsien (TW); Wei-Qing Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 607 days.

(21) Appl. No.: 12/575,551

(22) Filed: Oct. 8, 2009

(65) Prior Publication Data

US 2010/0254628 A1    Oct. 7, 2010

(30) Foreign Application Priority Data

Apr. 1, 2009    (CN) .......................... 2009 1 0301286

(51) Int. Cl.
  *G06K 9/36*    (2006.01)
  *G06K 9/44*    (2006.01)
(52) U.S. Cl. ......... 382/258; 382/259; 382/284; 345/634
(58) Field of Classification Search .................. 382/257, 382/258, 259, 284, 294; 345/629, 634
See application file for complete search history.

(56) References Cited

U.S. PATENT DOCUMENTS

| 2002/0044691 A1* | 4/2002 | Matsugu | 382/218 |
| 2004/0042640 A1* | 3/2004 | Ikeda et al. | 382/115 |
| 2010/0303306 A1* | 12/2010 | Pnueli et al. | 382/112 |

* cited by examiner

*Primary Examiner* — Jon Chang
(74) *Attorney, Agent, or Firm* — Altis Law Group, Inc.

(57) ABSTRACT

An image processing system and method for comparing two monochromic images A2 and B2 is provided. The system and method thins objects in the monochromic image B2 so as to generate a skeleton image B3, thickens the objects in the monochromic image A2 to generate a bold image A4, and overlays the skeleton image B3 with the bold image A4 so as to generate an overlaid image AB1. The system and method further thins the objects in the monochromic image A2 so as to generate a skeleton image A3, thickens the objects in the monochromic image B2 to generate a bold image B4, and overlays the skeleton image A3 with the bold image B4 so as to generate an overlaid image AB2. The system and method outputs the overlaid images AB1 and AB2 on a display screen.

20 Claims, 9 Drawing Sheets

IMAGE PROCESSING SYSTEM AND METHOD

BACKGROUND

1. Technical Field

Embodiments of the present disclosure generally relate to image processing, and more particularly to a system and method for comparing images.

2. Description of Related Art

Conventional methods of image matching or image comparison often only compare pixel values of each point of the images. Such methods of determining whether two images match may be ineffective. For example, when a poor quality scanner is used to capture an original image, the captured image may have noise points registering as content that differs from the original image. One example of the original image is shown in FIG. 1(A) and one example of the captured image is shown in FIG. 1(B). The noise point may be like the two white points in FIG. 1(B), for example.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1B:
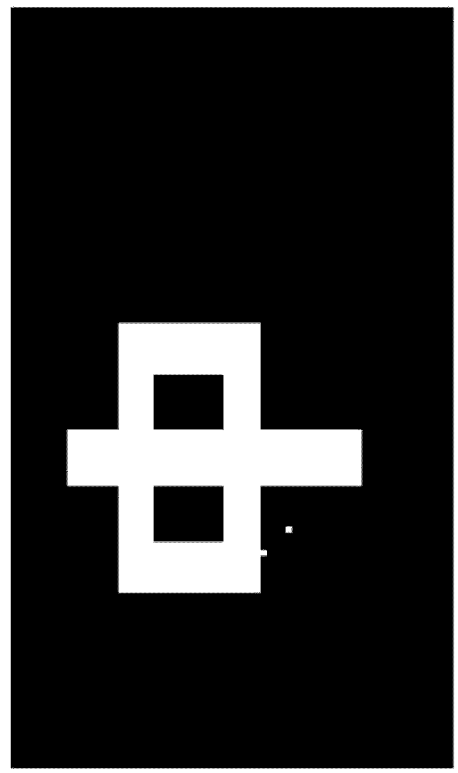
FIG. 1 includes FIG. 1(A) and FIG. 1(B) respectively showing an original image and a scanned image having noise points.
Figure 1A:
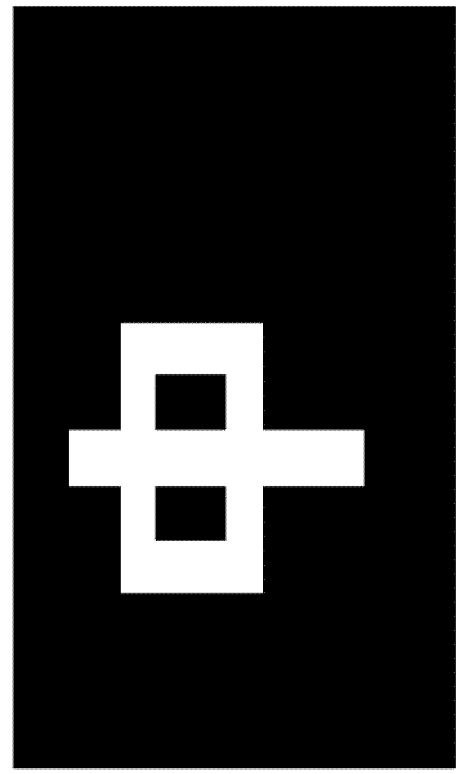
Figure 2:
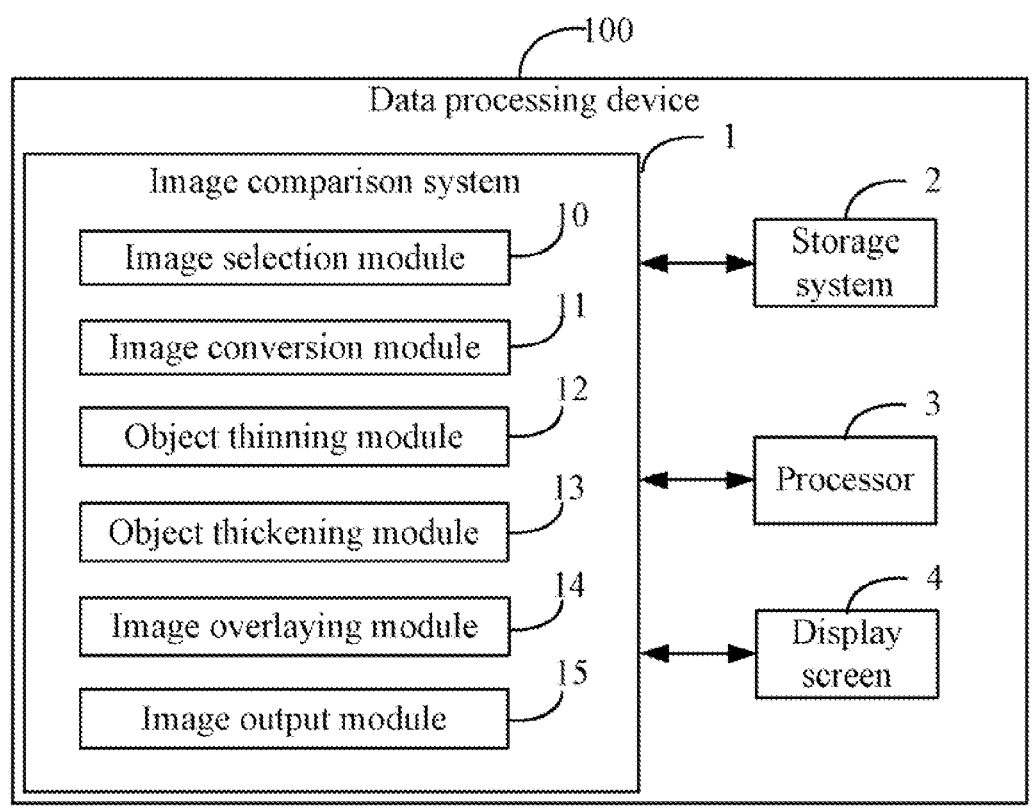
FIG. 2 is a block diagram of one embodiment of an image processing system.

FIG. 2 is a block diagram of one embodiment of an image processing system. In one embodiment, the image processing system may be a data processing device 100 that includes an image comparison system 1, a storage system 2, at least one processor 3, and a display screen 4. The data processing device 100 may be a personal computer, an application server, or a notebook computer, for example. The image comparison system 1 includes a plurality of functional modules (see below descriptions) operable to compare images.

In one embodiment, one or more computerized codes of the functional modules of the image comparison system 1 may be stored in the storage system 2. The functional modules may include an image selection module 10, an image conversion module 11, an object thinning module 12, an object thickening module 13, an image overlaying module 14, and an image output module 15. The at least one processor 3 is operable to execute the one or more computerized codes of the modules 10-15 to compare images from the storage system 2. The display screen 4 provides a user interface to display images that are compared.

Figure 5B:
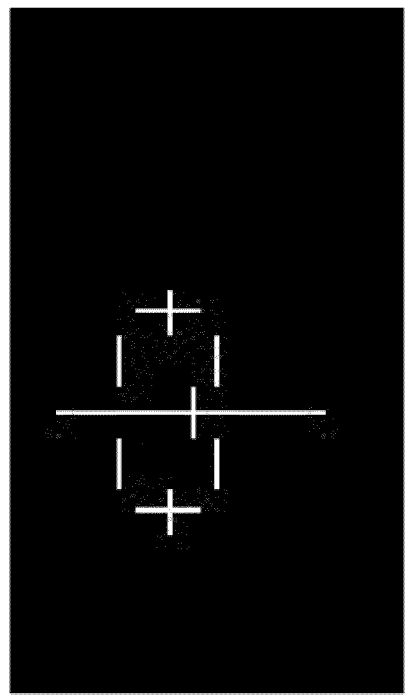
FIG. 5 includes FIG. 5(A) and FIG. 5(B) respectively showing a first monochromic image and a skeleton image of the first monochromic image.
Figure 5A:
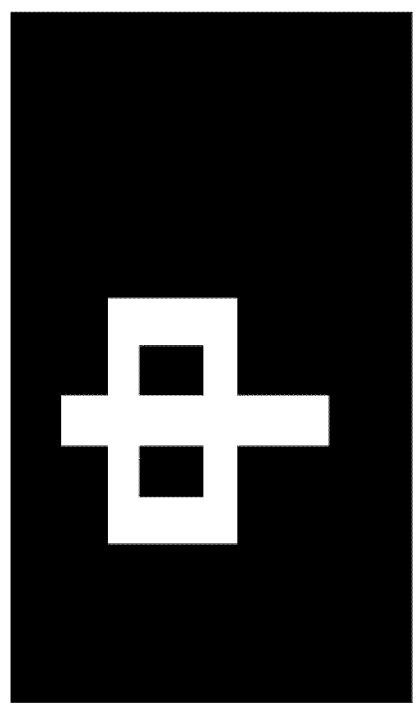

The image selection module 10 is operable to select images to be compared from the storage system 2. In one embodiment, the images may include an original image and a derived image which is generated from the original image. As an example, if the original image is scanned to generate a scanned image, the scanned image is the derived image. The images to be compared can be monochromic images or color images. It should be understood that the monochromic images only include two colors, such as black and white. In the monochromic image, objects may be white against a black background, or the objects may be black against a white background. FIG. 5(A) shows an example of a monochromic image, in which the object, namely a Chinese character "中", is white, and the background is black. It is easier to distinguish objects and the background in a monochromic image than a color image, thus, if the images to be compared are color images, the color images need to be converted to monochromic images.

The image conversion module 11 is operable to convert color images to be compared to monochromic images. The monochromic images may be stored in the storage system 2. In one embodiment, the image conversion module 11 converts a color image to a monochromic image as follows. The image conversion module 11 converts the color image to a grayscale image by computing a gray value of each point of the color image using a conversion formula, such as: gray value=R*0.3+G*0.59+B*0.11. In the conversion formula, R, G, and B represent red, green, and blue values of a point of the color image. The converting module 11 converts the grayscale image to the monochromic image by comparing a gray value of each point of the grayscale image with a threshold value. In one embodiment, if a gray value of a point exceeds or equals the threshold value, the gray value is changed to 255, and if less than the threshold value, to 0. It is noted that a gray value of 255 represents white and 0 represents black. In one embodiment, the threshold value may be 127.

The object thinning module 12 is operable to thin the objects in the monochromic images so as to generate skeleton images. The skeleton images may be stored in the storage system 2. The skeleton images may show the outlines or main features of objects in the monochromatic images. One example of a skeleton image is shown in FIG. 5(B). The skeleton image shown in FIG. 5(B) is generated from the monochromic image of FIG. 5(A). In one embodiment, the object thinning module 12 reads pixel values of all points in each row of the monochromic image. In the present embodiment, each of the pixel values is 0 or 255, since the monochromic image only includes the colors of black and white. As an example, if the objects in the monochromic image are white, and the background is black, the pixel values of the background are 0 and the pixel values of the objects are 255.

The object thinning module 12 searches the pixel values of the objects from each row to locate a plurality of groups that include consecutive pixel values of the objects. As an example, if the pixel values of all points in a row of the monochromic image include: 255, 255, 255, 0, 0, 255, 255, 255, 255, 255, 0, 0, and 255, the object thinning module 12 locates the two groups including "255, 255, 255" and "255, 255, 255, 255, 255." The object thinning module 12 updates the pixel values in each group by maintaining a central pixel value and changing the other pixel values so as to thin the objects in the monochromic image. In the example, the pixel values in each group other than the central pixel value are changed from 255 to 0. Thus, the pixel values in the two groups are updated to "0, 255, 0" and "0, 0, 255, 0, 0." Accordingly, in the example, the pixel values of all points in the row are changed to "0, 255, 0, 0, 0, 0, 0, 255, 0, 0, 0, 0, and 255."

Figure 6B:
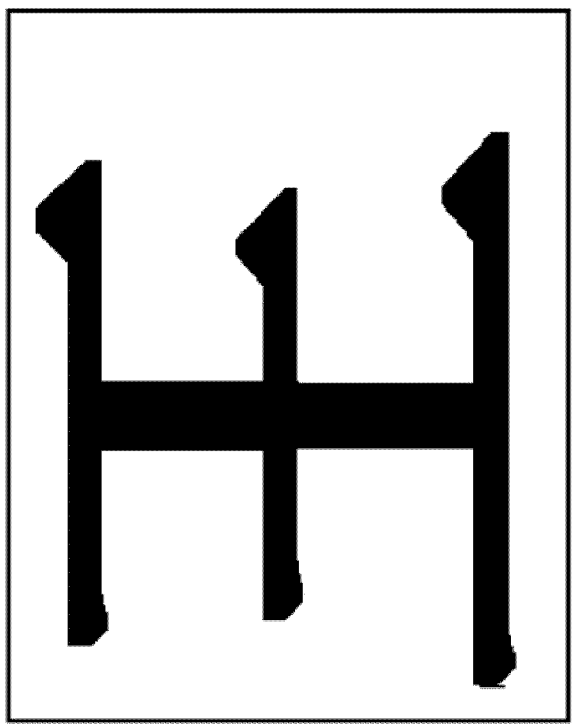
FIG. 6 includes FIG. 6(A) and FIG. 6(B) respectively showing a second monochromic image and a bold image of the second monochromic image.
Figure 6A:
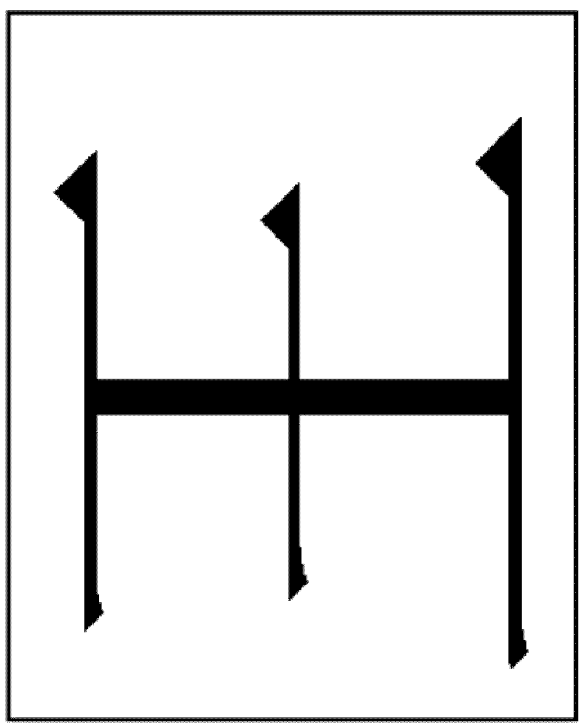

The object thickening module 13 includes a plurality of functional sub-modules (see below descriptions referring to FIG. 3), operable to thicken the objects in the monochromic images so as to generate bold images. FIG. 6(A) shows an example of a monochromic image having black objects, namely Chinese characters " 王," and white background. FIG. 6(B) shows an example of a bold image of the monochromic image of FIG. 6(A).

The image overlaying module 14 includes a plurality of functional sub-modules (see below descriptions referring to FIG. 4), operable to overlay the skeleton images with the bold images so as to generate overlaid images. The overlaid images may be stored in the storage system 2. In one embodiment, if a skeleton image B3 and a bold image B4 correspond to a monochromic image B2, a skeleton image A3 and a bold image A4 correspond to a monochromic image A2, the image overlaying module 14 overlays the skeleton image B3 with the bold image A4 to generate an overlaid image AB1, and overlays the skeleton image A3 with the bold image B4 to generate an overlaid image AB2.

The image output module 15 is operable to output the overlaid images on the display screen 4 of the data processing device 100.

Figure 3:
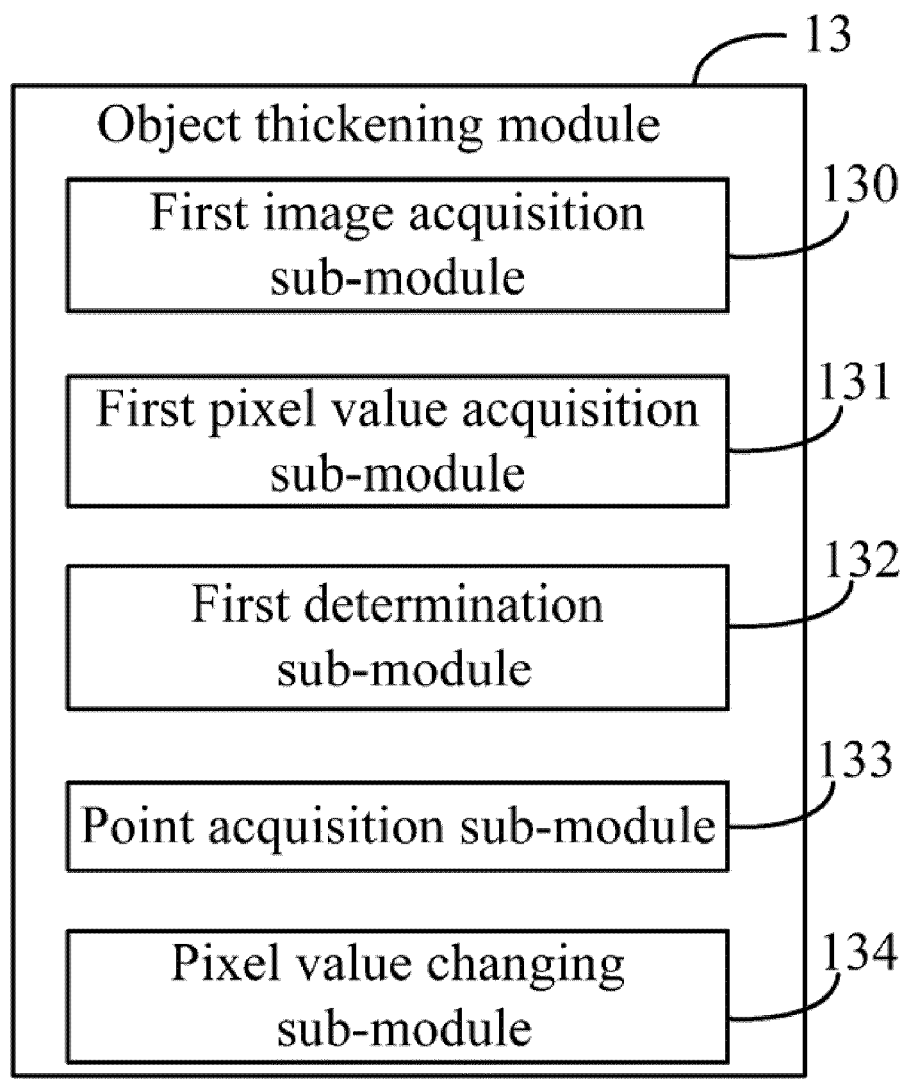
FIG. 3 is a block diagram of functional sub-modules of an object thickening module of the system of FIG. 2.

FIG. 3 is a block diagram of the functional sub-modules 130-134 of the object thickening module 13. In one embodiment, the functional sub-modules 130-134 may be a first image acquisition sub-module 130, a first pixel value acquisition sub-module 131, a first determination sub-module 132, a point acquisition sub-module 133, and a pixel value changing sub-module 134.

The first image acquisition sub-module 130 is operable to acquire a monochromic image from the storage system 2.

The first pixel value acquisition sub-module 131 is operable to acquire pixel values of all points in an Nth row of the monochromic image. It should be understood that the Nth row is selected from the first row to the last row of the monochromic image.

The first determination sub-module 132 is operable to determine whether the pixel value of an nth point in the Nth row is the same as a pixel value of the objects in the monochromic image. It should be understood that the nth point is selected from the first point to the last point in the Nth row of the monochromic image. The first determination sub-module 132 is further operable to determine if the nth point is the last point in the Nth row, and if the Nth row is the last row of the monochromic image.

The point acquisition sub-module 133 is operable to acquire a plurality of points from the monochromic image if the pixel value of the nth point in the Nth row is the same as the pixel value of the objects in the monochromic image. In one embodiment, the plurality of points are adjacent to the nth point in the Nth row.

The pixel value changing sub-module 134 is operable to change the pixel values of the plurality of points to the pixel value of the objects in the monochromic image, so as to thicken the objects in the monochromic image. For example, if the objects in the monochromic image are black, the pixel value changing sub-module 134 changes the pixel values of the plurality of points to 0.

Figure 4:
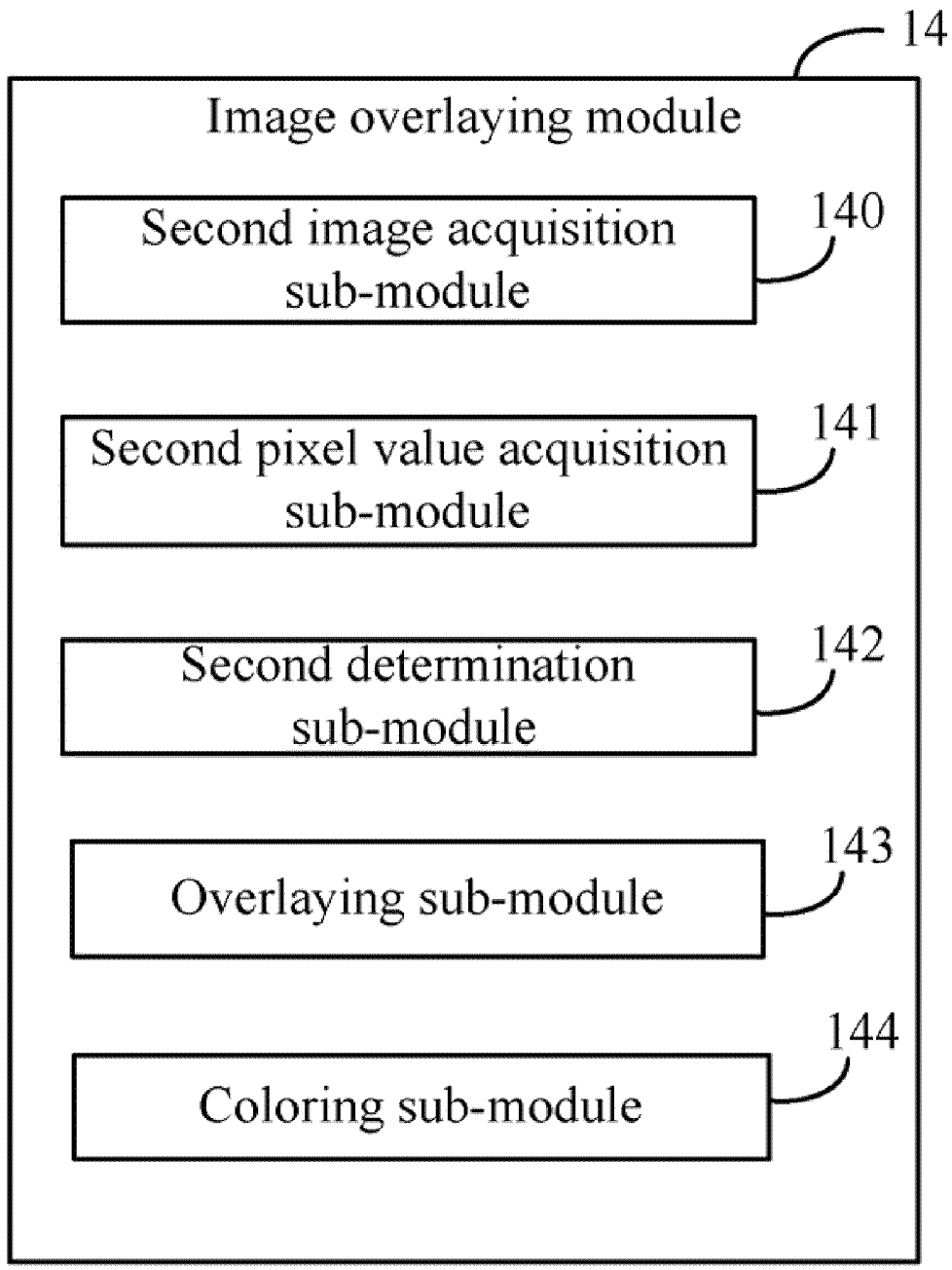
FIG. 4 is a block diagram of functional sub-modules of an image overlaying module of the system of FIG. 2.

FIG. 4 is a block diagram of the functional sub-modules 140-144 of the image overlaying module 14. In one embodiment, the functional sub-modules 140-144 may comprise a second image acquisition sub-module 140, a second pixel value acquisition sub-module 141, a second determination sub-module 142, an overlaying sub-module 143, and a coloring sub-module 144.

The second image acquisition sub-module 140 is operable to acquire a skeleton image and a bold image from the storage system 2. In the present embodiment, both the skeleton image and the bold image have black objects on white background.

The second pixel value acquisition sub-module 141 is operable to acquire pixel values of all points in an Nth row of the skeleton image and pixel values of all points in an Nth row of the bold image. It should be understood that the Nth row is selected from the first row to the last row of the skeleton image and the bold image.

The second determination sub-module 142 is operable to determine whether the pixel value of an nth point in the Nth row of the skeleton image is the same as the pixel value of an nth point in the Nth row of the bold image. It should be understood that the nth point is selected from the first point to the last point in the Nth row of the skeleton image and the bold image. The second determination sub-module 142 is further operable to determine if the nth point in the Nth row of the bold image is black, namely having a pixel value of 0. The second determination sub-module 142 is further operable to determine if the nth point is the last point in the Nth row and if the Nth row is the last row of the skeleton image and the bold image.

The overlaying sub-module 143 is operable to overlay the nth point in the Nth row of the skeleton image with the nth point in the Nth row of the bold image if the pixel value of the nth point in the Nth row of the skeleton image is the same as the pixel value of the nth point in the Nth row of the bold image or the nth point in the Nth row of the bold image is black.

The coloring sub-module 144 is operable to color the nth point in the Nth row of the skeleton image if the pixel value of the nth point in the Nth row of the skeleton image is different from the pixel value of the nth point in the Nth row of the bold image and the nth point in the Nth row of the bold image is white. It should be understood that color points in the skeleton image are unallowable variances of the images to be compared.

Figure 7:
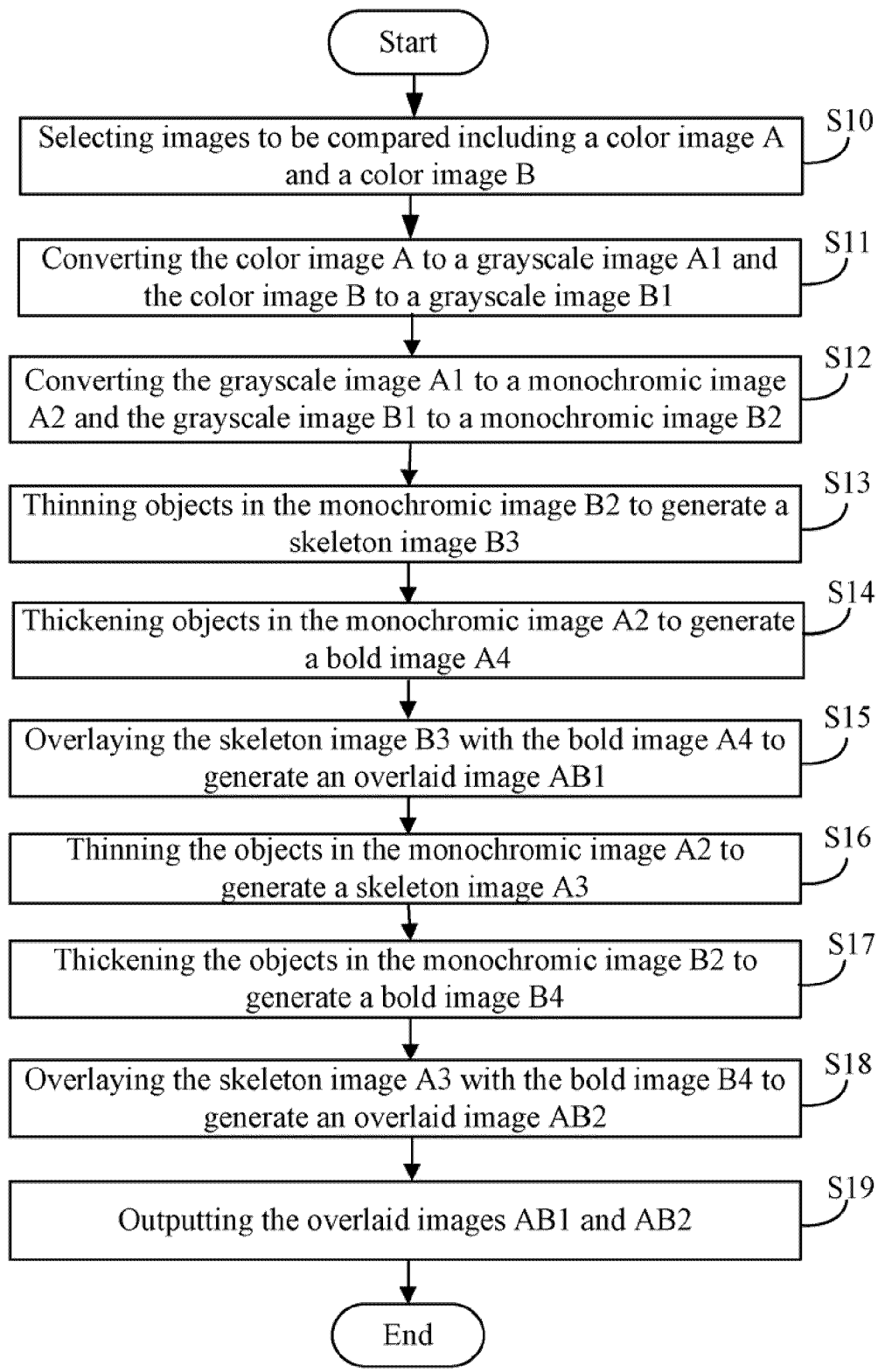
FIG. 7 is a flowchart of one embodiment of an image processing method.

FIG. 7 is a flowchart illustrating one embodiment of an image processing method. Depending on the embodiment, additional blocks in the flow of FIG. 7 may be added, others removed, and the ordering of the blocks may be changed.

In block S10, the image selection module 10 selects images to be compared from the storage system 2. The images to be compared may be monochromic images or color images. In the present embodiment, the images to be compared are color images including a color image A and a color image B.

In block S11, the image conversion module 11 converts the color image A to a grayscale image A1 and converts the color image B to a grayscale image B1. In an embodiment, the conversion is accomplished by computing a gray value of each point of the color images A and B using a conversion formula, such as: gray value=R*0.3+G*0.59+B*0.11. In the conversion formula, R, G, and B represent red, green, and blue values.

In block S12, the image conversion module 11 converts the grayscale image A1 to a monochromic image A2 and converts the grayscale image B1 to a monochromic image B2. The monochromic images A2 and B2 may be stored in the storage system 2. In an embodiment, the conversion is accomplished by comparing a gray value of each point of the grayscale images A1 and B1 with a threshold value. In one embodiment, the threshold value may be 127. If a gray value of a point exceeds or equals the threshold value, the gray value is changed to 255, and if a gray value of a point is less than the threshold value, the gray value is changed to 0. It should be understood that the gray value of 255 represents white and the gray value of 0 represents black.

In block S13, the object thinning module 12 thins objects in the monochromic image B2 so as to generate a skeleton image B3. The skeleton image B3 may be stored in the storage system 2. In one embodiment, the object thinning module 12 reads pixel values of all points in each row of the monochromic image B2. The object thinning module 12 searches the pixel value of the objects from each row to locate a plurality of groups that include consecutive pixel values of the objects. As an example, if the objects in the monochromic image B2 are white, and if the pixel values of all points in a row of the monochromic image include: 255, 255, 255, 0, 0, 255, 255, 255, 255, 255, 0, 0, and 255, the object thinning module 12 locates two groups including "255, 255, 255" and "255, 255, 255, 255, 255." The object thinning module 12 updates the pixel values in each group by maintaining a central pixel value and changing the other pixel values so as to thin the objects in the monochromic image B2. In the example, the pixel values in each group other than the central pixel value are changed from 255 to 0. Thus, the pixel values in the two groups are updated to "0, 255, 0" and "0, 0, 255, 0, 0." Accordingly, in the example, the pixel values of all points in the row are changed to "0, 255, 0, 0, 0, 0, 0, 255, 0, 0, 0, 0, and 255."

In block S14, the object thickening module 13 thickens objects in the monochromic image A2 to generate a bold image A4. The bold image A4 may be stored in the storage system 2. A detailed description of generating the bold image A4 is given as follows, referring to FIG. 8.

In block S15, the image overlay module 14 overlays the skeleton image B3 with the bold image A4 so as to generate an overlaid image AB1 to facilitate comparing images A2 and B2 to see if they match. The overlaid image AB1 may be stored in the storage system 2. A detailed description of generating the overlaid image AB1 is given as follows, referring to FIG. 9.

In block S16, the object thinning module 12 thins the objects in the monochromic image A2 so as to generate a skeleton image A3. The skeleton image A3 may be stored in the storage system 2. As mentioned, the object thinning module 12 reads pixel values of all points in each row of the monochromic image A2. The object thinning module 12 searches the pixel values of the objects from each row to locate a plurality of groups that include consecutive pixel values of the objects. The object thinning module 12 updates the pixel values in each group by maintaining a central pixel value and changing the other pixel values so as to thin the objects in the monochromic image A2.

In block S17, the object thickening module 13 thickens the objects in the monochromic image B2 to generate a bold image B4. The bold image B4 may be stored in the storage system 2. A detailed description of generating the bold image B4 is given as follows, referring to FIG. 8.

In block S18, the image overlaying module 14 overlays the skeleton image A3 with the bold image B4 so as to generate an overlaid image AB2, as follows, referring to FIG. 9. The overlaid image AB2 may be stored in the storage system 2.

In block S19, the image output module 15 outputs the overlaid images AB1 and AB2 on the display screen 4 of the data processing device 100.

Figure 8:
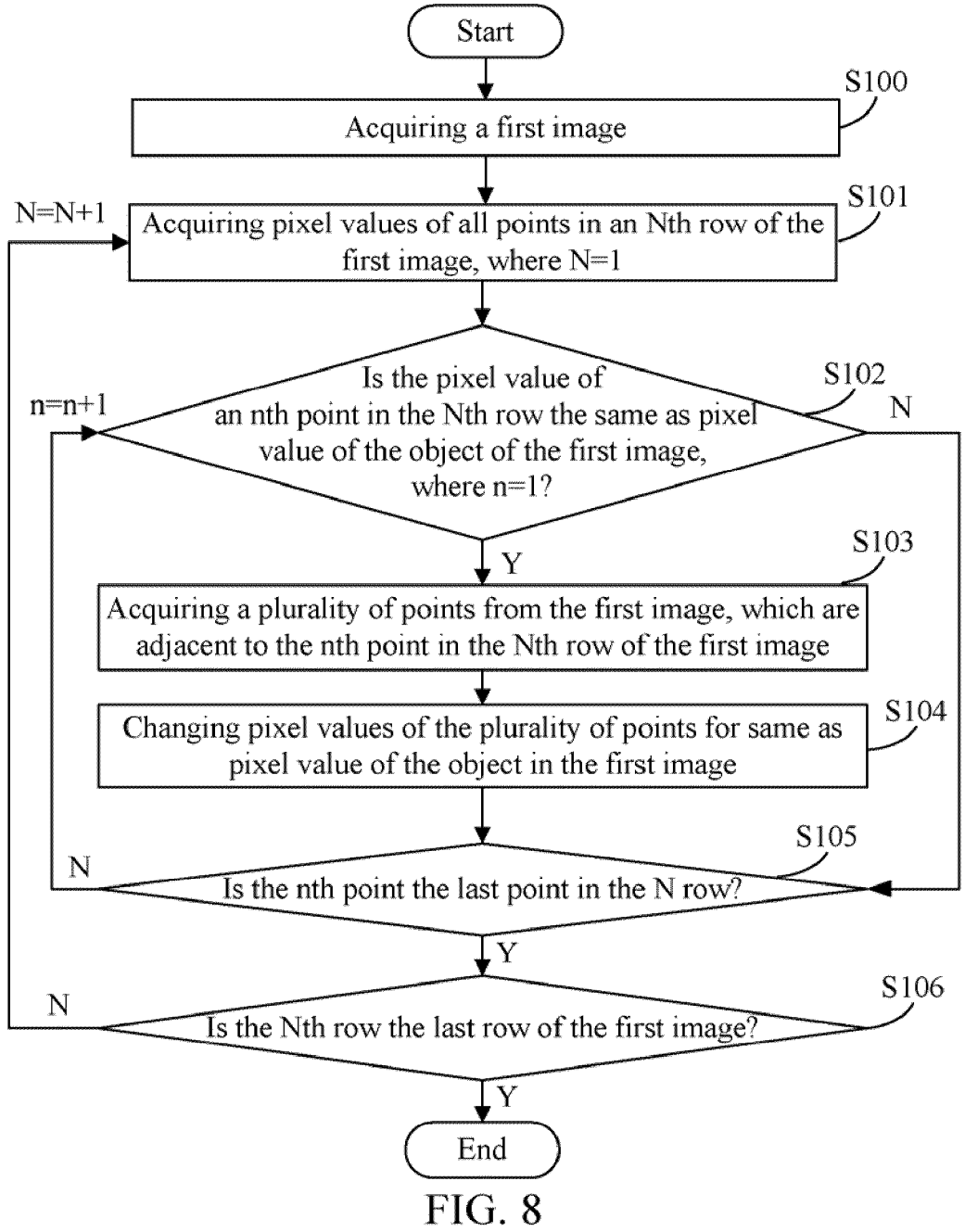
FIG. 8 details blocks S14 and S17 of FIG. 7.

FIG. 8 details blocks S14 and S17 of FIG. 7, namely, generation of a bold image B4 or A4. Depending on the embodiment, additional blocks in the flow of FIG. 8 may be added, others removed, and the ordering of the blocks may be changed.

In block S100, the first image acquisition sub-module 130 acquires a first image from the storage system 2. In the description of block S14 of FIG. 7, namely generation of the bold image A4, the first image is the monochromic image A2. In the description of block S17 of FIG. 7, namely generation of the bold image B4, the first image is the monochromic image B2.

In block S101, the first pixel value acquisition sub-module 131 acquires pixel values of all points in an Nth row of the first image. It should be understood that the Nth row is selected from the first row to the last row of the first image.

In block S102, the first determination sub-module 132 determines whether the pixel value of an nth point in the Nth row is the same as a pixel value of the objects in the first image. It should be understood that the nth point is selected from the first point to the last point in the Nth row of the first image. Block S105 is implemented if the pixel value of the nth point in the Nth row is different from the pixel value of the objects in the first image. Otherwise, block S103 is implemented if the pixel value of the nth point in the Nth row is the same as the pixel value of the objects in the first image.

In block S103, the point acquisition sub-module 133 acquires a plurality of points from the first image. In one embodiment, the plurality of points are adjacent to the nth point in the Nth row of the first image.

In block S104, the pixel value changing sub-module 134 changes the pixel values of the plurality of points to the pixel value of the objects in the first image so as to thicken the objects in the first image. For example, if the objects in the monochromic image are black, the pixel value changing sub-module 134 changes the pixel values of the plurality of points to 0.

In block S105, the first determination sub-module 132 determines if the nth point is the last point in the Nth row of the first image. Block S102 is implemented to determine whether the pixel value of an (n+1)th point in the Nth row is the same as the pixel value of the objects in the first image if the nth point is not the last point in the Nth row of the first image. Otherwise, block S106 is implemented if the nth point is the last point in the Nth row of the first image.

In block S106, the first determination sub-module 132 further determines if the Nth row is the last row of the first image. Block S101 is repeated to acquire pixel values of all points in an (N+1)th row of the first image if the Nth row is not the last row of the first image. Otherwise, if the Nth row is the last row of the first image, the process is complete.

Figure 9:
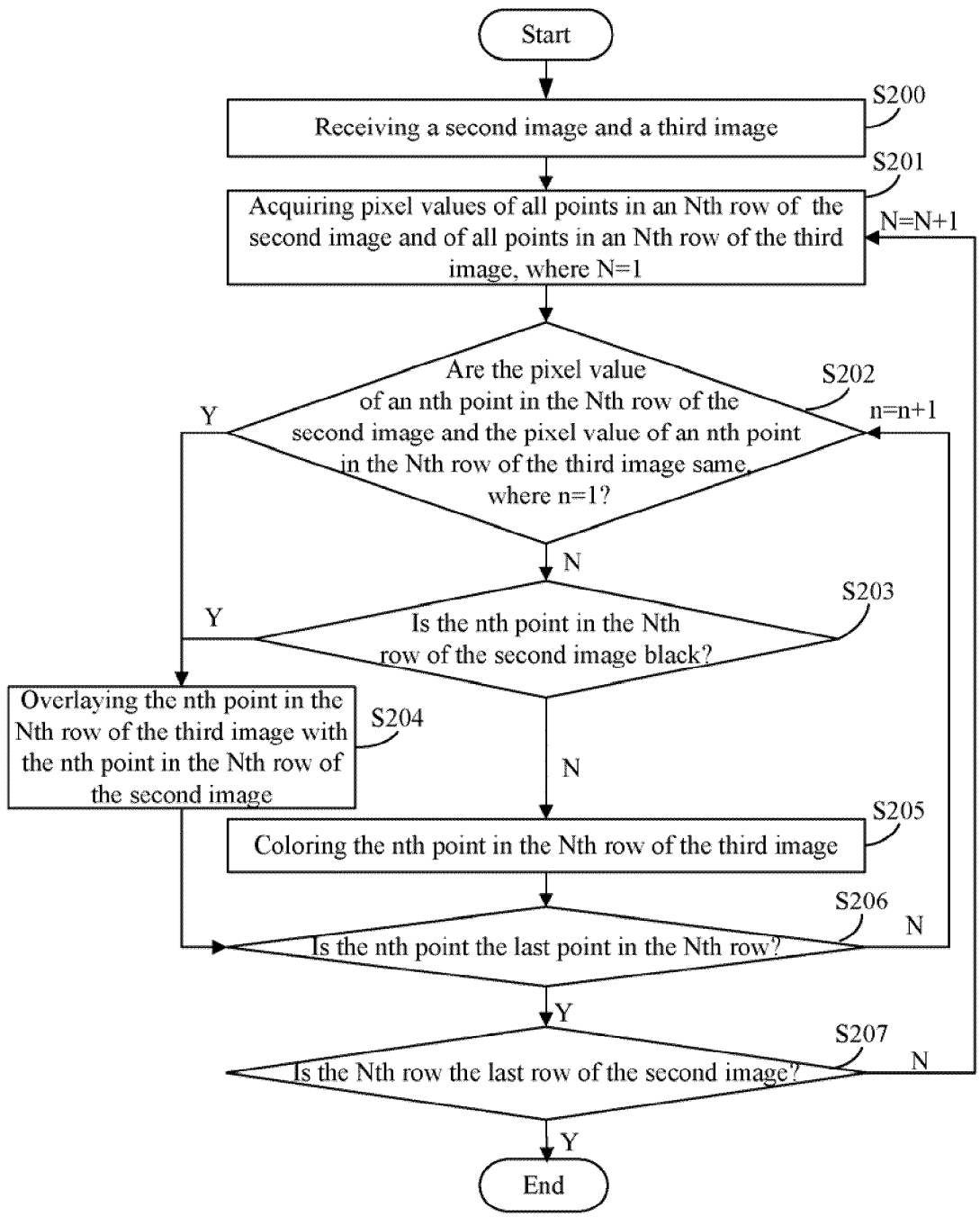
FIG. 9 details blocks S15 and S18 of FIG. 7.

FIG. 9 details blocks S15 and S18 of FIG. 6, namely, generation of an overlaid image AB1 or AB2. Depending on the embodiment, additional blocks in the flow of FIG. 9 may be added, others removed, and the ordering of the blocks may be changed.

In block S200, the second image acquisition sub-module 140 acquires a second image and a third image from the storage system 2. Both the second image and the second image have black objects on white background. In the description of block S15 of FIG. 7, namely generation of overlaid image AB1, the second image is the bold image A4 and the third image is the skeleton image B3. In the description of block S18 of FIG. 7, namely generation of overlaid image AB2, the second image is the bold image B4 and the third image is the skeleton image A3.

In block S201, the second pixel value acquisition sub-module 141 acquires pixel values of all points in an Nth row of the second image and pixel values of all points in an Nth row of the third image. It should be understood that the Nth row is selected from the first row to the last row of the second image and the third image.

In block S202, the second determination sub-module 142 determines whether the pixel value of an nth point in the Nth row of the second image is the same as the pixel value of an nth point in the Nth row of the third image. It should be understood that the nth point is selected from the first point to the last point in the Nth row of the second image and the third image. Block S204 is implemented if the pixel value of the nth point in the Nth row of the second image is the same as the pixel value of the nth point in the Nth row of the third image. Otherwise, block S203 is implemented if the pixel value of the nth point in the Nth row of the second image is different from the pixel value of an nth point in the Nth row of the third image.

In block S203, the second determination sub-module 142 further determines if the nth point in the Nth row of the second image is black, namely having a pixel value of 0. Block S205 is implemented if the nth point in the Nth row of the second image is not black. Otherwise, block S204 is implemented if the nth point in the Nth row of the second image is black.

In block S204, the overlaying sub-module 143 overlays the nth point in the Nth row of the third image with the nth point in the Nth row of the second image.

In block S205, the coloring sub-module 144 colors the nth point in the Nth row of the third image so as to generate color points. It should be understood that the color points in the third image are unallowable variances of the images to be compared.

In block S206, the second determination sub-module 142 determines if the nth point is the last point in the Nth row. Block S202 is implemented to determine whether the pixel value of an (n+1)th point in the Nth row of the second image is the same as the pixel value of an (n+1)th point in the Nth row of the third image if the nth point is not the last point in the Nth row. Otherwise, block S207 is implemented if the nth point is the last point in the Nth row.

In block S207, the second determination sub-module 142 determines if the Nth row is the last row of the second image and the third image. Block S201 is repeated to acquire pixel values of all points in an (N+1)th row of the second image and pixel values of all points in an (N+1)th row of the third image if the Nth row is not the last row of the second image and the third image. Otherwise, if the Nth row is the last row of the second image and the third image, the process is complete.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An image processing system for comparing images, the system comprising:
   an object thinning module operable to thin objects in a first monochromic image and thin objects in a second monochromic image, so as to generate a skeleton image of the first monochromic image and a skeleton image of the second monochromic image;
   an object thickening module operable to thicken the objects in the first monochromic image and thicken the objects in the second monochromic image, so as to generate a bold image of the first monochromic image and a bold image of the second monochromic image;
   an image overlaying module operable to overlay the skeleton image of the first monochromic image with the bold image of the second monochromic image, and overlay the skeleton image of the second monochromic image with the bold image of the first monochromic image, so as to respectively generate an overlaid image;
   an image output module operable to output the overlaid images on a display screen; and
   a processor that executes the object thinning module, the object thickening module, the image overlaying module, and the image output module.

2. The system as described in claim 1, further comprising an image conversion module operable to convert color images to the first and the second monochromic images.

3. The system as described in claim 1, wherein the object thinning module thins the objects in the first and the second monochromic images by:
   reading pixel values of all points in each row of the first monochromic image, searching the pixel values of the objects of the first monochromic image in each row to locate a plurality of groups that include consecutive pixel values of the objects of the first monochromic image, and updating the pixel values in each group by maintaining a central pixel value and changing the other pixel values; and
   reading pixel values of all points in each row of the second monochromic image, searching the pixel values of the objects of the second monochromic image in each row to locate a plurality of groups that include consecutive pixel values of the objects of the second monochromic image, and updating the pixel values in each group by maintaining a central pixel value and changing the other pixel values.

4. The system as described in claim 1, wherein the object thickening module comprises:
   a first pixel value acquisition sub-module operable to acquire pixel values of all points in an Nth row of the first monochromic image, and acquire pixel values of all points in an Nth row of the second monochromic image;
   a first determination sub-module operable to determine whether the pixel value of an nth point in the Nth row of the first monochromic image is the same as the pixel value of the objects in the first monochromic image, and determine if the nth point is the last point in the Nth row of the first monochromic image and if the Nth row is the last row of the first monochromic image, and operable to determine whether the pixel value of an nth point in the Nth row of the second monochromic image is the same as the pixel value of the objects in the second monochromic image, and determine if the nth point is the last point in the Nth row of the second monochromic image and if the Nth row is the last row of the second monochromic image;

a point acquisition sub-module operable to acquire a plurality of points from the first monochromic image when the pixel value of the nth point in the Nth row of the first monochromic image is the same as the pixel value of the objects in the first monochromic image, and operable to acquire a plurality of points from the second monochromic image when the pixel value of the nth point in the Nth row of the second monochromic image is the same as the pixel value of the objects in the second monochromic image; and a pixel value changing sub-module operable to change the pixel values of the plurality of points acquired from the first monochromic image for same as the pixel value of the objects in the first monochromic image, and operable to change the pixel values of the plurality of points acquired from the second monochromic image for same as the pixel value of the objects in the second monochromic image.

5. The system as described in claim 4, wherein the plurality of points acquired from the first monochromic image are adjacent to the nth point in the Nth row of the first monochromic image, and the plurality of points acquired from the second monochromic image are adjacent to the nth point in the Nth row of the second monochromic image.

6. The system as described in claim 1, wherein the image overlaying module comprises:

a second pixel value acquisition sub-module operable to acquire pixel values of all points in an Nth row of the skeleton image of the first monochromic image and pixel values of all points in an Nth row of the bold image of the second monochromic image, and operable to acquire pixel values of all points in an Nth row of the skeleton image of the second monochromic image and pixel values of all points in an Nth row of the bold image of the first monochromic image;

a second determination sub-module operable to determine whether the pixel value of an nth point in the Nth row of the skeleton image of the first monochromic image is the same as the pixel value of an nth point in the Nth row of the bold image of the second monochromic image, and whether the pixel value of an nth point in the Nth row of the skeleton image of the second monochromic image is the same as the pixel value of an nth point in the Nth row of the bold image of the first monochromic image, determine if the nth point in the Nth row of each of the bold images is black, further determine if the nth point is the last point in the Nth row and if the Nth row is the last row of each of the skeleton images and each of the bold images;

an overlaying sub-module operable to overlay the nth point in the Nth row of the skeleton image of the first monochromic image with the nth point in the Nth row of the bold image of the second monochromic image upon the condition that the pixel value of the nth point in the Nth row of the skeleton image of the first monochromic image is the same as the pixel value of the nth point in the Nth row of the bold image of the second monochromic image or the nth point in the Nth row of the bold image of the second monochromic image is black, and overlay the nth point in the Nth row of the skeleton image of the second monochromic image with the nth point in the Nth row of the bold image of the first monochromic image upon the condition that the pixel value of the nth point in the Nth row of the skeleton image of the second monochromic image is the same as the pixel value of the nth point in the Nth row of the bold image of the first monochromic image or the nth point in the Nth row of the bold image of the first monochromic image is black; and a coloring sub-module operable to color the nth point in the Nth row of each of the skeleton image of the first monochromic image upon the condition that the pixel value of the nth point in the Nth row of the skeleton image of the first monochromic image is different from the pixel value of the nth point in the Nth row of the bold image of the second monochromic image and the nth point in the Nth row of the bold image of the second monochromic image is white, and operable to color the nth point in the Nth row of each of the skeleton image of the second monochromic image upon the condition that the pixel value of the nth point in the Nth row of the skeleton image of the second monochromic image is different from the pixel value of the nth point in the Nth row of the bold image of the first monochromic image and the nth point in the Nth row of the bold image of the first monochromic image is white.

7. An image processing method for comparing images, the method being performed by execution of computer readable program code by at least one processor, the method comprising:

(a) thinning objects in a monochromic image B2 so as to generate a skeleton image B3;
(b) thickening objects in a monochromic image A2 to generate a bold image A4;
(c) overlaying the skeleton image B3 with the bold image A4 so as to generate an overlaid image AB1;
(d) thinning the objects in the monochromic image A2 so as to generate a skeleton image A3;
(e) thickening the objects in the monochromic image B2 to generate a bold image B4;
(f) overlaying the skeleton image A3 with the bold image B4 so as to generate an overlaid image AB2; and
(g) outputting the overlaid images AB1 and AB2 on a display screen.

8. The method as described in claim 7, before step (a) the method further comprising:

converting a color image A to a grayscale image A1 and converting a color image B to a grayscale image B1 by computing a gray value of each pixel of the color images A and B using a conversion formula; and converting the grayscale image A1 to the monochromic image A2 and converting the grayscale image B1 to the monochromic image B2 by comparing a gray value of each point of the grayscale images A1 and the grayscale image B1 with a predefined threshold value.

9. The method as described in claim 7, wherein step (a) comprises:

reading pixel values of all points in each row of the monochromic image B2;

searching the pixel values of the objects in the monochromic image B2 from each row to locate groups that include consecutive pixel values of the objects; and updating the pixel values in each group by maintaining a central pixel value and changing the other pixel values so as to generate the skeleton image B3.

10. The method as described in claim 7, wherein step (b) comprises:

(b1) acquiring pixel values of all points in each row of the monochromic image A2;

(b2) determining from the first point in the first row until the last point in the last row that whether the pixel value of the point is the same as the pixel value of the objects in the monochromic image A2;

(b3) acquiring a plurality of points from the monochromic image A2 upon the condition that the pixel value of the point is the same as the pixel value of the objects in the monochromic image A2; and (b4) changing the pixel values of the plurality of points for same as the pixel value of the objects in the monochromic image A2.

11. The method as described in claim 7, wherein step (c) comprises:

(c1) acquiring pixel values of all points in each row of the skeleton image B3 and pixel values of all points in each row of the bold image A4;

(c2) overlaying from the first point in the first row until the last point in the last row of the skeleton image B3 with a corresponding point of the bold image A4 upon the condition that the pixel value of the point of the skeleton image B3 is the same as the pixel value of the corresponding point of the bold image A4 or the corresponding point of the bold image is black; and (c3) coloring the point of the skeleton image B3 upon the condition that the pixel value of the point of the skeleton image B3 is different from the pixel value of the corresponding point of the bold image A4 and the corresponding point of the bold image is white.

12. The method as described in claim 7, wherein step (d) comprises:

reading pixel values of all points in each row of the monochromic image A2;

searching the pixel values of the objects in the monochromic image A2 from each row to locate groups that include consecutive pixel values of the objects; and updating the pixel values in each group by maintaining a central pixel value and changing the other pixel values so as to generate the skeleton image A3.

13. The method as described in claim 7, wherein step (e) comprises:

(e1) acquiring pixel values of all points in each row of the monochromic image B2;

(e2) determining from the first point in the first row until the last point in the last row that whether the pixel value of the point is the same as the pixel value of the objects in the monochromic image B2;

(e3) acquiring a plurality of points from the monochromic image B2 upon the condition that the pixel value of the point is the same as the pixel value of the objects in the monochromic image B2; and (e4) changing the pixel values of the plurality of points for same as the pixel value of the objects in the monochromic image B2.

14. The method as described in claim 7, wherein step (f) comprises:

(f1) acquiring pixel values of all points in each row of the skeleton image A3 and pixel values of all points in each row of the bold image B4;

(f2) overlaying from the first point in the first row until the last point in the last row of the skeleton image A3 with a corresponding point of the bold image B4 upon the condition that the pixel value of the point of the skeleton image A3 is the same as the pixel value of the corresponding point of the bold image B4 or the corresponding point of the bold image is black; and (f3) coloring the point of the skeleton image A3 upon the condition that the pixel value of the point of the skeleton image A3 is different from the pixel value of the corresponding point of the bold image B4 and the corresponding point of the bold image is white.

15. A non-transitory storage medium having stored thereon instructions that, when executed by a processor, cause the processor to perform an image processing method for comparing images, the method comprising:

(a) thinning objects in a monochromic image B2 so as to generate a skeleton image B3;

(b) thickening objects in a monochromic image A2 to generate a bold image A4;

(c) overlaying the skeleton image B3 with the bold image A4 so as to generate a overlaid image AB1;

(d) thinning the objects in the monochromic image A2 so as to generate a skeleton image A3;

(e) thickening the objects in the monochromic image B2 to generate a bold image B4;

(f) overlaying the skeleton image A3 with the bold image B4 so as to generate an overlaid image AB2; and (g) outputting the overlaid images AB1 and AB2.

16. The storage medium as described in claim 15, before step (a) the method further comprising:

converting a color image A to a grayscale image A1 and converting a color image B to a grayscale image B1 by computing a gray value of each pixel of the color images A and B using a conversion formula; and converting the grayscale image A1 to the monochromic image A2 and converting the grayscale image B1 to the monochromic image B2 by comparing a gray value of each point of the grayscale images A1 and B1 with a predefined threshold value.

17. The storage medium as described in claim 15, wherein step (a) comprises:

reading pixel values of all points in each row of the monochromic image B2;

searching the pixel values of the objects in the monochromic image B2 from each row to locate groups that include consecutive pixel values of the objects; and updating the pixel values in each group by maintaining a central pixel value and changing the other pixel values so as to generate the skeleton image B3; and step (d) comprises:

reading pixel values of all points in each row of the monochromic image A2;

searching the pixel values of the objects in the monochromic image A2 from each row to locate groups that include consecutive pixel values of the objects; and updating the pixel values in each group by maintaining a central pixel value and changing the other pixel values so as to generate the skeleton image A3.

18. The storage medium as described in claim 15, wherein step (b) comprises:

(A) acquiring pixel values of all points in each row of the monochromic image A2;

(B) determining from the first point in the first row until the last point in the last row of the monochromic image A2 that whether the pixel value of the point is the same as the pixel value of the objects in the monochromic image A2;

(C) acquiring a plurality of points from the monochromic image A2 upon the condition that the pixel value of the point is the same as the pixel value of the objects in the monochromic image A2; and (D) changing the pixel values of the plurality of points for same as the pixel value of the objects in the monochromic image A2; and step (e) comprising:

(A) acquiring pixel values of all points in each row of the monochromic image B2;

(B) determining from the first point in the first row until the last point in the last row of the monochromic image B2 that whether the pixel value of the point is the same as the pixel value of the objects in the monochromic image B2;

(C) acquiring a plurality of points from the monochromic image B2 upon the condition that the pixel value of the point is the same as the pixel value of the objects in the monochromic image B2; and (D) changing the pixel values of the plurality of points for same as the pixel value of the objects in the monochromic image B2.

19. The storage medium as described in claim 18, wherein the plurality of points acquired from the monochromic image A2 are adjacent to the point whose pixel value of the point is the same as the pixel value of the objects of the monochromic image A2, and the plurality of points acquired from the monochromic image B2 are adjacent to the point whose pixel value of the point is the same as the pixel value of the objects of the monochromic image B2.

20. The storage medium as described in claim 15, wherein each of steps (c) comprises:

(1) acquiring pixel values of all points in each row of the skeleton image B3 and pixel values of all points in each row of the bold image A4;

(2) overlaying from the first point in the first row until the last point in the last row of the skeleton image B3 with a corresponding point of the bold image A4 upon the condition that the pixel value of the point of the skeleton image B3 is the same as the pixel value of the corresponding point of the bold image A4 or the corresponding point of the bold image A4 is black; and (3) coloring the point of the skeleton image B3 upon the condition that the pixel value of the point of the skeleton image B3 is different from the pixel value of the corresponding point of the bold image A4 and the corresponding point of the bold image A4 is white; and steps (f) comprises:

(1) acquiring pixel values of all points in each row of the skeleton image A3 and pixel values of all points in each row of the bold image B4;

(2) overlaying from the first point in the first row until the last point in the last row of the skeleton image A3 with a corresponding point of the bold image B4 upon the condition that the pixel value of the point of the skeleton image A3 is the same as the pixel value of the corresponding point of the bold image B4 or the corresponding point of the bold image B4 is black; and (3) coloring the point of the skeleton image A3 upon the condition that the pixel value of the point of the skeleton image A3 is different from the pixel value of the corresponding point of the bold image B4 and the corresponding point of the bold image B4 is white.

* * * * *